Aug. 11, 1953
R. PETERS
2,648,240
CLAMPING DEVICE
Filed May 31, 1952
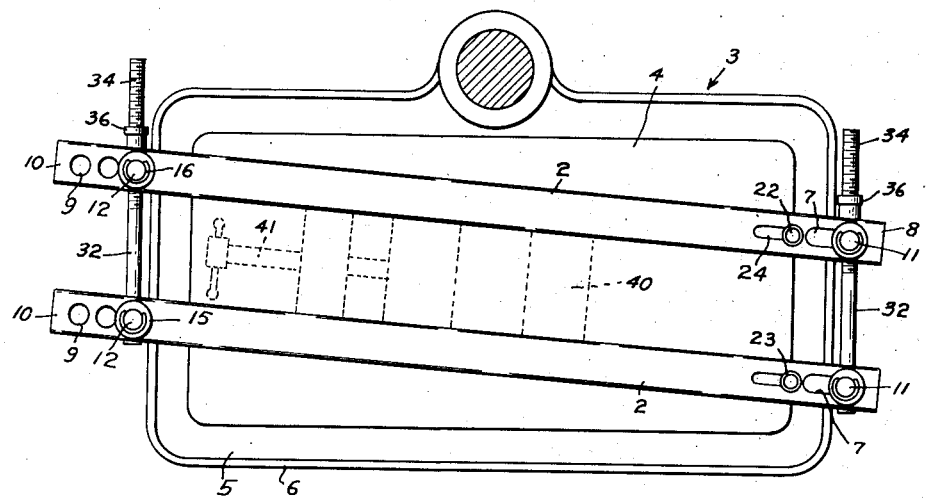
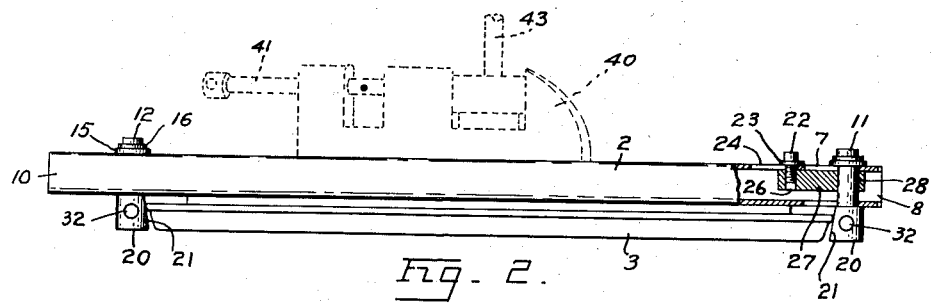
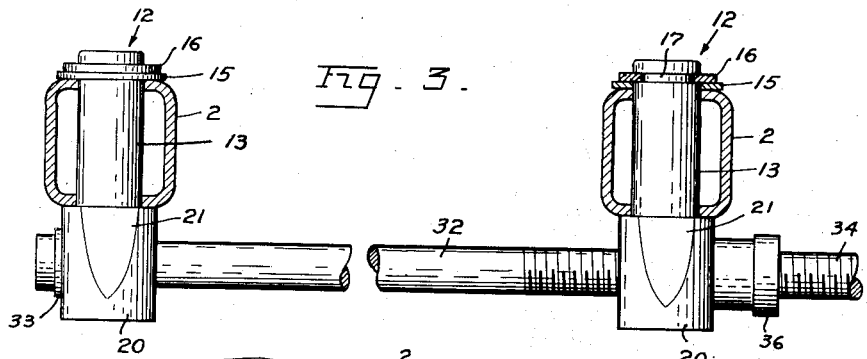
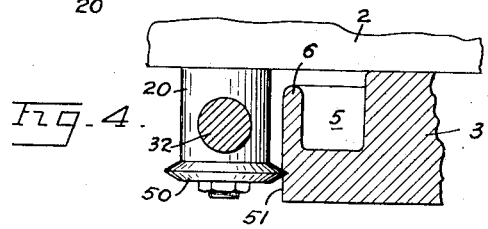
INVENTOR.
RUDOLPH PETERS
BY White and Riaboff
ATTORNEYS Patented Aug. 11, 1953

2,648,240

UNITED STATES PATENT OFFICE 2,648,240

CLAMPING DEVICE

Rudolph Peters, Oakland, Calif.

Application May 31, 1952, Serial No. 290,981

6 Claims. (Cl. 77—63)

This invention relates to a clamping device for holding an object on a drill press table during drilling operation.

It has been always a problem in a drilling operation to center a piece to be drilled under the drill and have it firmly secured to a drill press table. Usually a piece to be drilled is first carefully centered under a drill, and thereafter the same is secured to a drill press table by means of a clamp or otherwise. Quite often securing a piece to a drill press table moves the piece slightly, and thereupon it has to be centered again. These operation have to be carefully performed and take a lot of time and attention. If a piece is not properly and sufficiently secured, it may move and break the drill, or it may become loose and start to spin with the drill which often causes accidents.

The object of this invention is to provide a device for holding an object on a drill press table by which an object to be drilled is automatically centered in relation to the drill and locked by rotation of the latter to the drill press table.

Another object of this invention is to provide a device of the type described which may be used on drill press tables of different size and which may accommodate objects of different sizes.

Still another object of this invention is to provide a device which is simple in construction, efficient for the purpose intended, cheap to produce and operate.

Other objects and advantages will appear as the specification proceeds and the novel features of the device will be particularly pointed out in the claims hereto annexed.

In this specification and the annexed drawings, the invention is illustrated in the form considered to be the best but it is understood, that the invention is not limited to such form, and it is also to be understood that in and by the claims following the description, it is desired to cover the invention in whatsoever form it may be embodied.

My invention is illustrated in the accompanying drawing forming a part of the specification in which:

Fig. 1 is a plan view of the device shown as used on a drill press table and holding a vice.

Fig. 2 is a side view of the Fig. 1.

Fig. 3 is an enlarged end view of the device, some parts being shown in section, and Fig. 4 is a cross-section of a modified form of the swivel.

In detail, my device, shown in Figs. 1–3, consists of a pair of hollow bars 2 extending beyond the length of a drill press table 3. The latter usually consists of an elevated central portion 4 surrounded by an oil groove 5 formed by an outer lip 6 extending upwardly and around said central portion 4. The outer wall of the lip 6 slopes downwardly and inwardly at an angle to the central vertical axis of the table.

Each bar 2 has a long slot 7 at the end 8 and round holes 9 at the end 10 thereof through which slots and one of the holes pass swivels 11 and 12 respectively. Each swivel has a shank 13 passing through the slot 7 or the hole 9 in the bar 2. The shank 13 carries on the top thereof a washer 15 and a retaining ring 16 which is inserted in a groove 17 in said shank and prevents the washer 15 from moving upwardly. A base 20 extends downwardly from said shank, which base is of considerably larger diameter than that of said swivel, and has one side thereof facing the drill press table 3 leveled as shown at 21. This arrangement permits each of the swivels 11 and 12 to rotate freely in said slots or holes, and yet said swivels are securely locked against vertical movements in said bars.

The swivel 11 at the end 8 may be moved in said slot 7 and held in a desired position by a bolt 22 passing through a washer 23 and a slot 24 adjoining said slot 7. The bolt 22 terminates in a threaded hole 26 of a link 27. The latter has a hole 28 through which the shank 13 passes. In order to adjust the position of said swivel 11, the bolt 22 is loosened and moved in the slot 24 thus moving the link 27 and the swivel 11 into a desired position. Thereupon the bolt 22 is tightened, which securely locks the swivel 11 in a new position.

Adjustments for greater distance between the swivels 11 and 12 on the same bar 2 are made by moving the swivel 12 near the end 10 from one hole 9 into another one.

The swivels 11 of each bar are connected by an adjusting rod 32, which passes through the base 20 of each swivel. The bars 2 and the rods 32 form a parallelogram in which the angular relation of the bars and rods may be easily changed. Each rod 32 is provided with a retaining ring 33 on one end thereof and has its other end threaded as shown at 34 to admit a knurled adjusting nut 36.

The operation of the device is as follows: The device is placed on the drill press table 3 and the distance between the swivels 11 and 12 of each bar 2 is so adjusted as to be slightly bigger than the length of the table which permits said device to be moved freely forth and back on said table. An object to be drilled is placed into a usual hand vice 40 and locked therein by a screw 41. The vice 40 is placed on the drill table 3 between the bars 2. The distance between the bars 2 is so adjusted by the adjusting rods 32 as to be slightly bigger than the width of said vice which permits the vice to be moved freely between said bars. Then the the vice 40 is moved under the drill 43 to place the object under the same so that said drill is exactly above the center of the future hole. The drill is gradually pressed down. Rotation of the drill 43 forces the object, the vice and the device to rotate, which rotation is stopped when the bases 20 come in contact with the outer walls of the lip 6, as shown in Figs. 1 and 2. The device now occupies a position in which the adjusting rods 32 are substantially parallel to the sides of the drill press table 3 and the bars 2 are at an angle to said sides, thus being closer to each other than when said bars 2 were at the right angle to said sides. This jams the vice 40 between the bars 2 with considerable force. The bases 20 abut said outer walls of the lip 6 by their leveled sides 21, and thus securely press the device downwardly. Consequently, the rotation of the device at one and the same time locks the vice in the device and the latter to the drill press table. The vice 40 centers itself automatically as at the beginning of the rotation as the vice is free to move on table in any direction.

It is obvious that an object to be drilled may be placed directly between the bars 2, if said object is of such shape as it may be clamped securely between the straight parallel sides of the bars 2.

Fig. 4 shows a modified form of the base 20, in which a disk 50 with a sharp edge is rotatably attached to the bottom thereof. This arrangement may be used with a drill press table in which the outer wall 51 is vertical. The rotation of the device forces the disks 50 to bite into the wall 51 and thus prevent the device from moving upwardly.

I claim:

1. A device for holding an object to be drilled on a drill press table comprising a pair of parallel bars, a pair of rods connecting said bars, swivel means connecting said rods with said bars permitting the latter to swing in relation to said rods, said swivel means having extensions for engaging the side of said drill press table.

2. A device for holding an object to be drilled on a drill press table, comprising a pair of parallel bars adapted to retain an object therebetween, a swivel mounted at each end of said bars, a pair of rods, each of said rods being operatively connected to the swivels of the adjacent ends of said bars, each of the swivels having a part dependent therefrom for engaging the side of said drill press table.

3. A device for holding an object to be drilled by a drill press on a drill press table, comprising a pair of parallel bars, a pair of parallel rods connecting said bars at their respective ends to form a parallelogram, a pivot means connecting each bar and rod permitting said bars and rods to assume various angular positions in relation to each other and to jam between said bars an object to be drilled; said pivot means extending beyond said bars to engage the side of said drill press table, when said device is on said table.

4. The combination of a drill press table with a device for holding an object to be drilled said device comprising a pair of bars resting on the table, swivel means at each end of said bars, a pair of rods, each rod operatively connecting the swivel means of the adjacent ends of said bars, said swivel means having means for engaging the side of the drill press table when said device is rotated thereon.

5. The combination of a drill press table with a device for holding an object to be drilled, said device comprising a pair of parallel bars, a pair of parallel rods connecting the ends of said bars and forming with said bars a parallelogram; pivot means for connecting said bars and rods, said pivot means permitting said bars and rods to assume various angular positions in relation to each other and to jam the object between said bars, said pivot means extending downwardly beyond the upper surface of the drill press table and adapted to engage the side thereof to hold the device downwardly.

6. The combination of a drill press table with a device for holding an object to be drilled, said device comprising a pair of bars resting on the table, swivel means at each end of said bars, a pair of rods, each rod operatively connecting the swivel means of the adjacent ends of said bars, said swivel means having means for engaging the side of the drill press table when said device is rotated thereon, and means for adjusting the distances between said bars and said rods.

RUDOLPH PETERS.

References Cited in the file of this patent

UNITED STATES PATENTS

| Number | Name | Date |
|---|---|---|
| 1,267,447 | Phelan | May 28, 1918 |
| 2,374,286 | Hargadon | Apr. 24, 1945 |